(12) United States Patent
Rodrigues et al.

(10) Patent No.: US 7,487,385 B2
(45) Date of Patent: Feb. 3, 2009

(54) APPARATUS AND METHOD FOR RECOVERING DESTROYED DATA VOLUMES

(75) Inventors: Steven Rodrigues, Mountain View, CA (US); Ratnesh Gupta, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 527 days.

(21) Appl. No.: 10/980,143

(22) Filed: Nov. 1, 2004

(65) Prior Publication Data

US 2006/0107103 A1    May 18, 2006

(51) Int. Cl.
*G06F 11/00* (2006.01)
(52) U.S. Cl. .................... 714/6; 714/5; 714/7; 714/13; 714/42
(58) Field of Classification Search .............. 714/5, 714/6, 7, 13, 42
See application file for complete search history.

(56) References Cited

U.S. PATENT DOCUMENTS

| | | | |
|---|---|---|---|
| 4,974,156 A | 11/1990 | Harding et al. | |
| 5,615,352 A | 3/1997 | Jacobson et al. | |
| 5,822,782 A * | 10/1998 | Humlicek et al. | 711/170 |
| 5,950,230 A | 9/1999 | Islam et al. | |
| 6,363,457 B1 | 3/2002 | Sundberg | |
| 6,453,369 B1 | 9/2002 | Imamura et al. | |
| 6,549,978 B2 | 4/2003 | Mansur et al. | |
| 6,636,984 B1 | 10/2003 | McBrearty et al. | |
| 6,694,335 B1 | 2/2004 | Hopmann et al. | |
| 6,725,331 B1 | 4/2004 | Kedem | |
| 6,931,558 B1 * | 8/2005 | Jeffe et al. | 713/340 |
| 6,952,794 B2 * | 10/2005 | Lu | 714/7 |
| 2003/0135782 A1 * | 7/2003 | Matsunami et al. | 714/5 |
| 2004/0068561 A1 * | 4/2004 | Yamamoto et al. | 709/224 |
| 2005/0015657 A1 * | 1/2005 | Sugiura et al. | 714/6 |
| 2005/0210314 A1 * | 9/2005 | Iguchi | 714/5 |
| 2006/0150001 A1 * | 7/2006 | Eguchi et al. | 714/6 |

* cited by examiner

*Primary Examiner*—Robert Beausoliel
*Assistant Examiner*—Joseph D Manoskey
(74) *Attorney, Agent, or Firm*—Perkins Coie LLP

(57) ABSTRACT

In an embodiment of the invention, a method is provided for updating configuration information associated with a data volume. The method reduces the occurrences of updates of saved configuration information of a data volume by updating the saved configuration information only when a change occurs in a configuration of the data volume.

17 Claims, 9 Drawing Sheets

APPARATUS AND METHOD FOR RECOVERING DESTROYED DATA VOLUMES

TECHNICAL FIELD

Embodiments of the invention relate generally to storage networks, and more particularly to an apparatus and method for recovering destroyed data volumes.

BACKGROUND

Storage devices are employed to store data that are accessed by computer systems. Examples of storage devices include volatile and non-volatile memory, floppy drives, hard disk drives, tape drives, optical drives, or another type of storage units. A storage device may be locally attached to an input/output (I/O) channel of a computer. For example, a hard disk drive may be connected to a computer's disk controller.

A storage device may also be accessible over a network. Examples of such a storage device include network attached storage (NAS) and storage area network (SAN) devices. A storage device may be a single stand-alone component or may include a system of storage devices such as in the case of Redundant Array Of Inexpensive Disks (RAID) groups and some Direct Access Storage Devices (DASD).

Generally, disk storage is typically implemented as one or more storage "volumes" (i.e., data volumes) that are formed by physical storage disks and define an overall logical arrangement of the storage space. Each volume is typically associated with its own file system. The storage disks within a volume may be typically organized as one or more groups of RAID. Therefore, a data volume is a logical collection in which the disk belongs.

A spare disk pool has spare disks that may be used as replacement storage disks. When a data volume is destroyed, the disks in the volume are placed in a spare disk pool, leaving the data on those disks intact other than configuration information that is used to identify the disk as part of a volume, and with the configuration information now identifying the disk as a spare disk. Such a disk is said to be an "unzeroed spare". Unzeroed spare disks may have data on them that comprise part of the data stored on a volume, and these are data that are not currently accessible since the volume was destroyed. A volume can be destroyed due to a number of possible reasons. As an example, a volume can be destroyed if the user unintentionally/accidentally or maliciously uses a command (e.g., "vol destroy" command) to destroy the volume.

When volume is being destroyed, the configuration information on all the disks that was part of that volume is updated to the effect that it is no longer part of a volume and the disk is now a spare disk. The user data is not erased at this point. Only the configuration information is updated on the disks so that the system now recognizes those disks as spare disks.

Hardware or firmware/software problems can also cause volumes to be destroyed. For example, certain firmware downloads onto particular types of disks can cause disk size shrinkage which loses the RAID disk labels for that disk. A RAID disk label is a form of metadata for the volume and is stored in the disk. The label may include various information such as, for example, volume information (e.g., name of the volume, raid tree id (identifier) of the volume, and other volume information), plex boundaries information (e.g., the number of plexes), and RAID Group boundaries information (e.g., the number of plexes). When the RAID label is lost or corrupted on a disk in the volume, the volume is destroyed or left incomplete or partial, and the volume cannot be brought online or intact. A partial volume is one that exists but not all of its data is accessible (due to, for example, missing disks or disk failures).

As another example related to hardware problems if a printed circuit board (PCB) in a disk is replaced by another PCB, and the disk is then inserted back into the data storage system, the storage operating system may not accept the disk. Therefore, a volume recovery process has to be performed to permit assimilation of the disk into the data storage system.

In one previous approach, RAID labels (where volume configuration information is stored) were fairly easy to understand and easy to manually modify in a product known as Data ONTAP™ which is commercially available from NETWORK APPLIANCE, INCORPORATED. The volume configuration information indicates the configuration of the data volume (e.g., number of disks, plexes and other configuration data as described below). When a volume is destroyed for a particular reason, customer support engineers can guide the user through a label editing session and the user can manually change the RAID labels in order to recover the destroyed volume. The label of each individual disk in the destroyed volume is edited, and RAID assimilation is then performed to complete the recovery of the volume. However, this label editing session is time consuming and error prone for the user, and the user is also required to know the volume associated with each disk and the disk mapping.

In a subsequent version of DataONTAP (version 6.2) from NETWORK APPLIANCE, INCORPORATED, the RAID labels were designed for program robustness and error-checking, rather than for ease by editing by hand. While these RAID labels were well suited for their intended purposes, volume recovery by users became very difficult, which may typically lead to frustration for users and for the customer support engineers. The current method to recover a destroyed volume is by use of the "label buildtree" command which is available in the "maintenance mode" in the current DataONTAP product. The label buildtree command accepts manual input for volume configuration, rather than automatically saving and restoring the volume configurations. A user could boot into the maintenance mode, and using documentation on the previous composition of the lost volume, the user can type in a command string that would recover the lost volume. This documentation contains accurate records about the volume prior to the volume being destroyed, and the records may include the identification of the disk in the volume, plex information, and the disk mapping in the RAID groups. But this current method requires that the user have the documentation of the volume's configuration before the data loss, and also requires that the disk names either to have not changed or that any disk name changes are known to the user. Furthermore, the process of typing in all of the numbers and names can be confusing, time consuming, and error prone for a user. This method also assumes that the information entered by the user is correct, as incorrect information may prevent the recovery of the lost volume or result in data corruption of the volume. Furthermore, this method requires booting into the maintenance mode.

Therefore, the current technology is limited in its capabilities and suffers from at least the above constraints and deficiencies.

SUMMARY OF EMBODIMENTS OF THE INVENTION

In an embodiment of the invention, a method is provided for updating configuration information associated with a data volume. The method reduces occurrences of updates of saved configuration information of a data volume by updating the saved configuration information only when a change occurs in a configuration of the data volume.

In another embodiment of the invention, an apparatus is provided for updating configuration information associated with a data volume. The apparatus includes a storage device manager configured to reduce occurrences of updates of saved configuration information of a data volume by updating the saved configuration information only when a change occurs in a configuration of the data volume.

An advantage made possible by an embodiment of the invention is the ability to save configuration information of a data volume and to avoid updating the saved configuration information except when absolute necessary (i.e., the save configuration information is updated only when a change occurs in the configuration of a data volume). Therefore, an embodiment of the invention reduces the frequency (occurrence) of the updates of the saved configuration information, without losing any of the essential configuration changes that occur. An embodiment of the invention allows the saved configuration information to be updated and kept as accurate, without making the configuration change process as unacceptably slow in speed. The method provided by an embodiment of the invention imposes less of a performance penalty on configuration changes on the volume. In contrast, previous approaches perform an update of the save configuration information far more frequently, even when changes do not actually occur in the saved configuration information.

In another embodiment of the invention, a method is provided for recovering a destroyed volume. The method first determines a volume that is to be recovered, and then selects the disks in a most recent saved configuration of volume.

In an embodiment of the invention, the act of selecting the disks includes the following. The candidate disks that belong to the volume are identified. An identification is also made on a most recent saved configuration information of the volume to be recovered, wherein the most recent saved configuration information contains the most recent saved configuration of the volume. A determination is made on a disks set that belongs to the most recently saved configuration of the volume, wherein the disks set is a subset of disks in the candidate disks. Labels are generated, where the labels contain the full configuration of the volume, where the full configuration includes the most recent saved configuration. The labels are written, where the labels contain the full configuration of the volume to the disks set.

In another embodiment of the invention, an apparatus is provided for recovering a destroyed volume. The apparatus includes a storage device manager configured to determine a volume that is to be recovered, and to select the disks in a most recent saved configuration of volume. In an embodiment, the storage device manager is configured to identify candidate disks that belong to the volume, identify a most recent saved configuration information of the volume to be recovered, wherein the most recent saved configuration information contains the most recent saved configuration of the volume, determine a disks set that belong to the most recently saved configuration of the volume, wherein the disks set is a subset of disks in the candidate disks, generate labels that contain a full configuration of the volume, where the full configuration includes the most recent saved configuration, and write labels containing the full configuration of the volume to the disks set.

In yet another embodiment of the invention, a method is provided for recovering a destroyed data volume. The method includes the following steps. The saved configuration information of spare disks and disks belonging to a partial raid tree are read. The disks for the destroyed volume that will be recovered are determined. A determination is made if any of the disks are unavailable for use in the destroyed data volume to be restored, by checking the time stamp in the saved configuration information in each disk. Proper raid labels are then generated for each disk that is available for use in the volume to be recovered, so that volume is recovered.

In yet another embodiment of the invention, an apparatus is provided for recovering a destroyed data volume. The apparatus includes a storage device manager configured to read saved configuration information of spare disks and disks belonging to a partial raid tree, determine the disks for the destroyed volume that will be recovered, determine if any of the disks are unavailable for use in the destroyed data volume to be restored, by checking the time stamp in the saved configuration information in each disk, and generate proper raid labels for each disks that is available for use in the volume to be recovered, so that volume is recovered.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
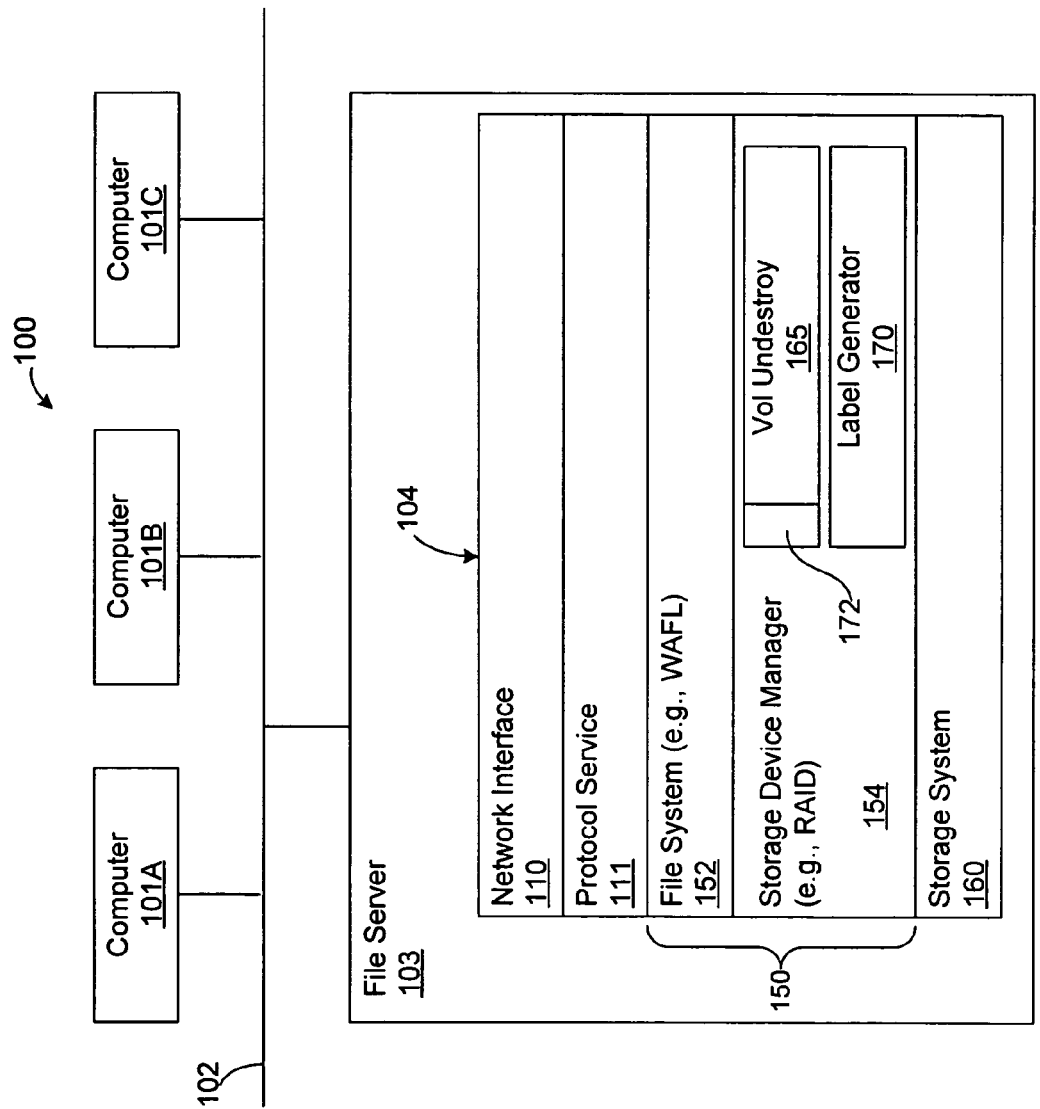
FIG. 1 is a block diagram of an apparatus, in accordance with an embodiment of the invention.

FIG. 1 illustrates a schematic diagram of a computing environment 100 in accordance with an embodiment of the invention. In the example of FIG. 1, one or more computers (generally referred to as computer 101 and specifically shown computers 101A, 101B, and 101C) are coupled to a file server 103 over a network 102. In an embodiment, the file server 103 includes at least some of the data storage and data management features of the product known as "FILER" which is commercially available from NETWORK APPLIANCE, INCORPORATED. However, the file server 103 can additionally or alternatively include features of other types of storage devices that provide data storage services. A computer 101 may be any type of data processing device capable of sending write and read requests to the file server 103. For example, a computer 101 may be, without limitation, a personal computer, mini-computer, mainframe computer, portable computer, workstation, wireless terminal, personal digital assistant, cellular phone, or another type of processing device. The file server 103 may also be any suitable computing device.

The network 102 may, for example, include various types of communication networks such as wide area networks, local area networks, the Internet, or another type of network. Other nodes on the network 102 such as, for example, gateways, routers, bridges, switches, firewalls, and/or the like, are not depicted in FIG. 1 for clarity of illustration. The components shown in FIG. 1 are also not necessarily drawn to scale, for clarity of illustration.

The file server 103 provides data storage services over the network 102. In one embodiment, the file server 103 processes data read and write requests from a computer 101. Of course, the file server 103 does not necessarily have to be accessible over network 102. Depending on the application, a file server 103 may, for example, also be locally attached to an input/output (I/O) channel of a computer 101.

As shown in FIG. 1, in an embodiment of the invention, the file server 103 may include a system 104 including a network interface 110, a protocol service 111, a storage operating system 150, and a storage system 160. The storage operating system 150 may further include a file system 152 and a storage device manager 154. The storage system 160 may include one or more storage devices. Components of the file server 103 may be implemented in hardware, software, and/or firmware. For example, the file server 103 may be a computer having one or more processors running computer-readable program code of the storage operating system 150 in memory. Software components of the file server 103 may be distributed on computer-readable storage media (e.g., CD-ROMS, tapes, disks, ZIP drive, and/or another type of storage media) or transmitted over wired or wireless link to a computer 101.

The network interface 110 includes components for receiving storage-related service requests over network 102 from, for example, a computer 101. A protocol service 111 parses and services the received requests. The protocol service 111 can support various types of network communication protocols such as, for example, Network File System (NFS), Common Internet File System (CIFS), Hypertext Transfer Protocol (HTTP), and/or other network protocols. The network interface 110 and protocol service 111 forwards a received service request to the storage operating system 150, which processes the request by reading data from the storage system 160 in the case of a read request, or by writing data to the storage system 160 in the case of a write request. Data read from the storage system 160 are transmitted over the network 102 to the requesting computer 101. Similarly, data to be written to the storage system 160 are received over network 102 from a computer 101.

The storage device manager 154 manages the storage devices in the storage system 160. The storage device manager 154 receives read and write commands from the file system 152 and processes the commands by accordingly accessing the storage system 160. In one embodiment, the storage device manager 154 manages storage devices in accordance with RAID (Redundant Array of Independent, or Inexpensive, Disks).

In an embodiment of the invention, the storage device manager 154 may include or is integrated with a volume undestroy ("vol undestroy") engine 165 which permits a method of recovering destroyed data volumes. The storage device manager 154 may also include or is integrated with a label generator 170 which generates or edits labels in a disk. As discussed below, the vol undestroy engine 165 also typically includes a label generator 172 that fills in a blank RAID label with the information stored in a saved configuration information and then recomputes the remainder of the RAID label through an iterative process.

Generally, disk storage is typically implemented as one or more storage "volumes" that is formed by physical storage disks and define an overall logical arrangement of storage space. Each volume is typically associated with its own file system.

Figure 2:
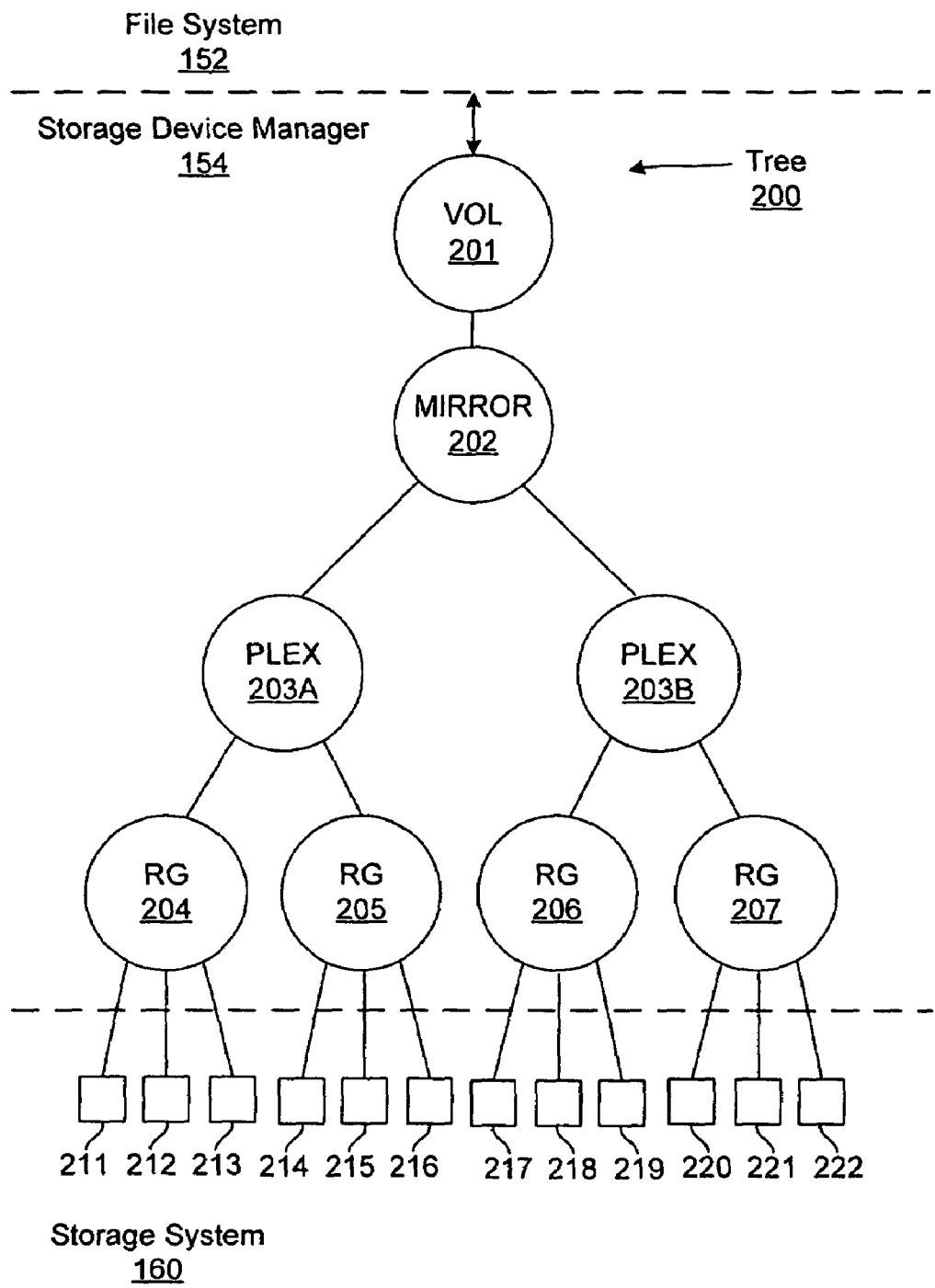
FIG. 2 shows a logical diagram illustrating the relationship between a file system, a storage device manager, and a storage system, in accordance with an embodiment of the present invention.

FIG. 2 shows a logical diagram further illustrating the relationship between a file system 152, a storage device manager 154, and a storage system 160, in accordance with an embodiment of the present invention. In one embodiment, a file system 152 and a storage device manager 154 are implemented in software while a storage system 160 is implemented in hardware. As can be appreciated, however, the file system 152, storage device manager 154, and storage system 160 may be implemented in hardware, software, and/or firmware or in combinations of hardware, software and/or firmware. For example, data structures, tables, and maps may be employed to define the logical interconnection between the file system 152 and storage device manager 154. As another example, the storage device manager 154 and storage system 160 may communicate via a disk controller. In one embodiment, the storage device manager 154 is configured to permit at least one of the methods described below.

The file system 152 manages files that are stored in storage system 160. In one embodiment, the file system 152 organizes files in accordance with the Write-Anywhere-File Layout (WAFL) as disclosed in the following commonly-assigned disclosures, which are hereby fully incorporated herein by reference: U.S. Pat. Nos. 6,289,356, 5,963,962, and 5,819,292. However, the invention is not so limited in accordance with WAFL, and the invention may also be used with other file systems and layouts. For example, an embodiment of the invention may be used with SANs or block-based systems.

It is noted that an embodiment of the invention permits two or more discrete storage units to be organized into logical collections. The storage units may be, for example, disk drives, compact flash, or non-volatile random access memory (NVRAM) cards. The logical collections are also not limited to RAID groups or plexes, as described in the examples herein. The logical collections may be any suitable logical units.

The storage device manager 154 manages the storage devices in the storage system 160. The storage device manager 154 receives read and write commands from the file system 152 and processes the commands by accordingly accessing the storage system 160. The storage device manager 154 takes a data block's logical address from the file system 152 and translates that logical address to a physical address in one or more storage devices in the storage system 160. In one embodiment, the storage device manager 154 manages the storage devices in accordance with Redundant Arrays of Inexpensive Disks (RAID) (e.g., RAID level 4). It should be understood, however, that an embodiment of the invention may also be used with data storage architectures other than RAID level 4. For example, an embodiment of the present invention may be used with other RAID levels, Direct Access Storage Devices (DASDs), and non-arrayed storage devices.

As shown in FIG. 2, in one embodiment, the storage device manager 154 is logically organized as a tree 200 of objects that include a volume 201, a mirror 202, plexes 203 (i.e., 203A and 203B), and RAID groups 204-207. The use of mirrors in conjunction with file systems is also discussed in the following commonly-assigned U.S. patent applications, which are hereby fully incorporated herein by reference: U.S. application Ser. No. 09/825,855, filed on Apr. 3, 2001 and U.S. application Ser. No. 09/684,487, filed on Oct. 4, 2000.

Note that an embodiment of the invention is also applicable to restoring a destroyed volume with an unmirrored plex. For example, the volume 201 can include only one of the plexes 203 (e.g., plex 203A).

Still referring to FIG. 2, the volume 201 represents a file system. The mirror 202 is one level below volume 201 and manages the pair of mirrored plexes 203. The plex 203A is a duplicate of the plex 203B, and vice versa. Each plex 203 represents a full copy of the file system of volume 201.

Below each plex 203 is one or more RAID groups that have associated storage devices in storage system 160. In the example of FIG. 2, the storage devices (storage units) 211-213 belong to the RAID group 204, the storage devices 214-216 belong to the RAID group 205, the storage devices 217-219 belong to the RAID group 206, and the storage devices 220-222 belong to the RAID group 207. The RAID group 204 mirrors the RAID group 206, while RAID group 205 mirrors the RAID group 207. As can be appreciated, the storage devices 211-222 are not necessarily housed in the same cabinet or facility. For example, the storage devices 211-216 may be located in a location (e.g., a data center) in one city, while the storage devices 217-222 may be in another location in another city. This advantageously allows data to remain available even if a facility housing one set of storage devices is hit by a disaster (e.g., fire, earthquake, or another event).

Because the plex 203A and plex 203B mirror each other, data may be accessed through either the plex 203A or plex 203B. This allows data to be accessed from a surviving plex in the event one of the plexes goes down and becomes inaccessible. This is particularly advantageous in mission-critical applications where a high degree of data availability is required. To further improve data availability, the plex 203A and plex 203B may also utilize separate pieces of hardware to communicate with storage system 160.

As further shown in FIG. 2, a tree object 200 may contain information about the objects of volume 201, mirror 202, plexes 203A and 203B, RAID groups 204-207, and the disks 211-222.

Figure 3:
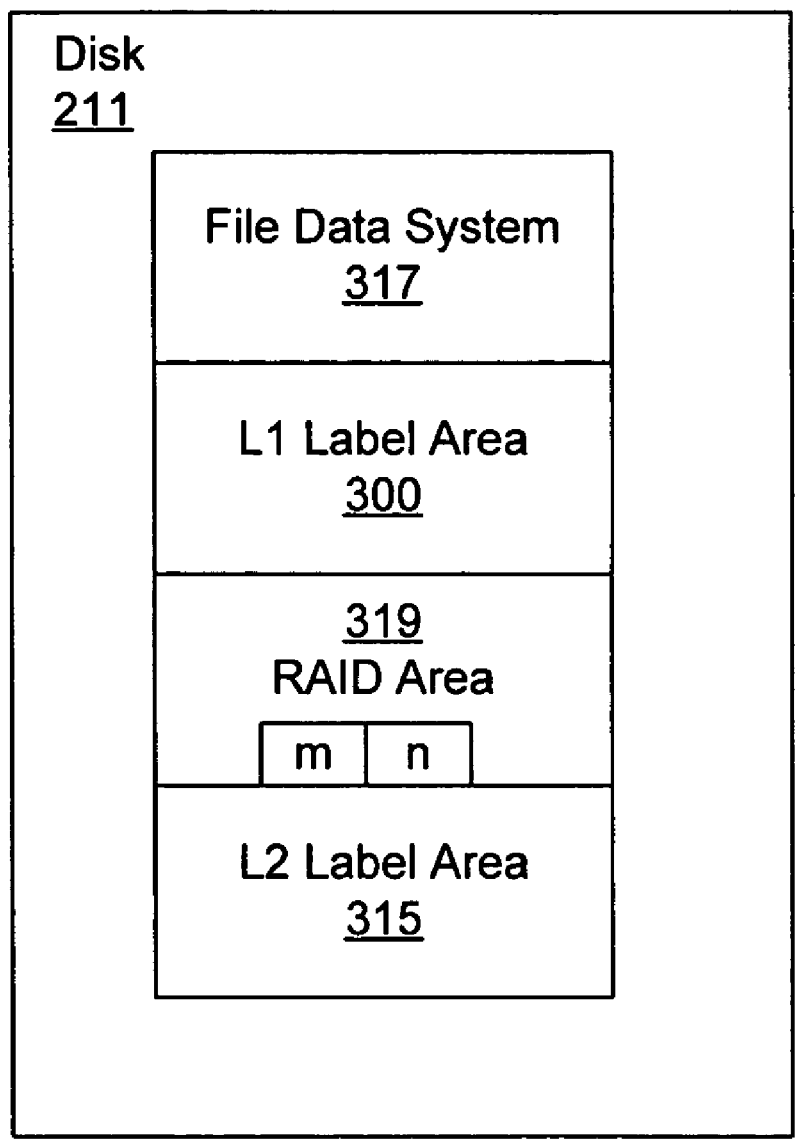
FIG. 3 is a block diagram that shows information that can be stored in a disk, in accordance with an embodiment of the present invention.

FIG. 3 is a block diagram that shows information that can be stored in a disk. For example, the disk 211 (or another disk in FIG. 2) includes a disk block 300 that stores a label L1 and a disk block 315 that stores a label L2. The labels L1 and L2 are known as RAID labels which are used to store the current configuration of a volume and other information, and are further described in commonly-owned U.S. patent application No. 10/105,872, by Steven Rodrigues and David Hitz, entitled "RAID ASSIMILATION METHOD AND APPARATUS", which is hereby fully incorporated herein by reference. The labels L1 and L2 are typically not contiguous on-disk. Typically, there are two RAID labels per disk in the volume, with the labels defining the role of the given disk in its volume. Label L2 is typically a copy of label L1, but label L2 may not necessarily be a copy of L1. Labels L1 and L2 are both necessary to preserve transactional semantics, as noted in the above-referenced U.S. patent application Ser. No. 10/105,872. Thus, the labels L1 and L2 help to define the current configuration of the volume that the disk 211 belongs to.

The disk 211 also includes File System data 317 and RAID area 319. The File System data 317 has the user data and metadata. The RAID Area 319 is not used for label storage, but is instead used for other storage-manager metadata. Note that the labels are stored in the Label Area(s) 300 and 315. In contrast, the saved configuration information used by the vol undestroy engine 165 is stored in the RAID Area 319, in accordance with an embodiment of the invention. The saved configuration information are referred to as saved configuration information (m) and configuration information (n) in FIG. 5. The saved configuration information is compared and/or updated by the vol undestroy engine 165, as discussed further below.

The label generator 170 (FIG. 1) generates the labels for a disk. The label generator 170 creates label (configuration) information in-memory, and the updated configuration information is written to the labels L1 and L2, as described in the above-referenced U.S. patent application Ser. No. 10/105,872.

Figure 4:
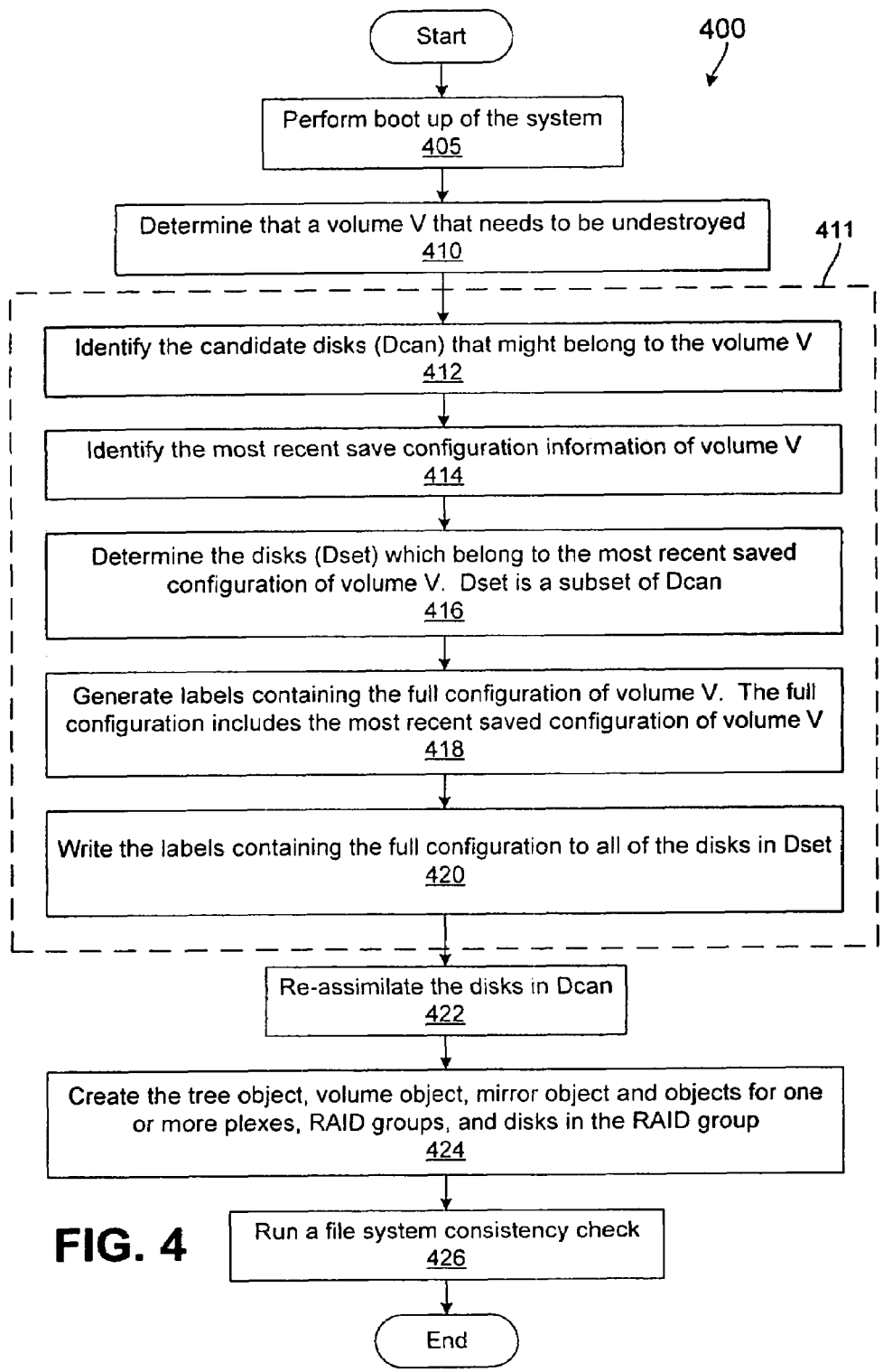
FIG. 4 is a flowchart of a method for recovering destroyed data volumes, in accordance with an embodiment of the invention.

FIG. 4 is a flowchart of a method 400 for recovering destroyed data volumes, in accordance with an embodiment of the invention. In block 405, a boot up is performed for the system 104 in the file server 103 (FIG. 1).

In block 410, the user determines that a volume V needs to be undestroyed (i.e., that the volume V needs to be recovered or restored).

In block 411, the vol undestroy engine 165 selects the disks in a most recent saved configuration of volume V. In an embodiment of the invention, block 411 includes blocks 412-420 which are discussed in detail below.

In block 412, the candidate disks (Dcan) that might belong to the volume V are identified by the vol undestroy engine 165.

In block 414, the most recent saved configuration information of volume V is identified by the vol undestroy engine 165.

In block 416, the vol undestroy engine 165 determines the disks Dset which belong to the most recent saved configuration of volume V (where Dset is a subset of disks of Dcan). The most recent saved configuration information contains the most recent saved configuration of volume V.

In block 418, the full configuration of volume V is generated. This block 418 involves the vol undestroy engine 165 generating new labels (containing the full configuration of volume V) to be written to the volume V's disks, before the old labels in volume V's disks are modified. The full configuration includes the most recent saved configuration of volume V.

In block 420, the vol undestroy engine 165 writes the labels containing the full configuration to all of the disks in Dset. This block 420 involves modifying the labels in the appropriate disks (Dset) in the destroyed volume V that is to be recovered (or generating labels in the usable disks in the volume V).

In block 422, re-assimilation is performed for the disks in Dcan. The re-assimilation method is described in the above-mentioned U.S. patent application Ser. No. 10/105,872. Re-assimilation permits the assimilation of the disks in Dcan into the data storage system and is one of the steps in the recovery of the volume V.

In block 424, various objects are created as part of the re-assimilation for the disks in Dcan. These objects include the tree object, volume object, mirror object (if any), and objects for one or more plexes, RAID groups, and the disks in the RAID group.

In block 426, the file system consistency check is run. A standard file system consistency check is performed, in order to permit use of the volume in a storage system.

Figure 5:
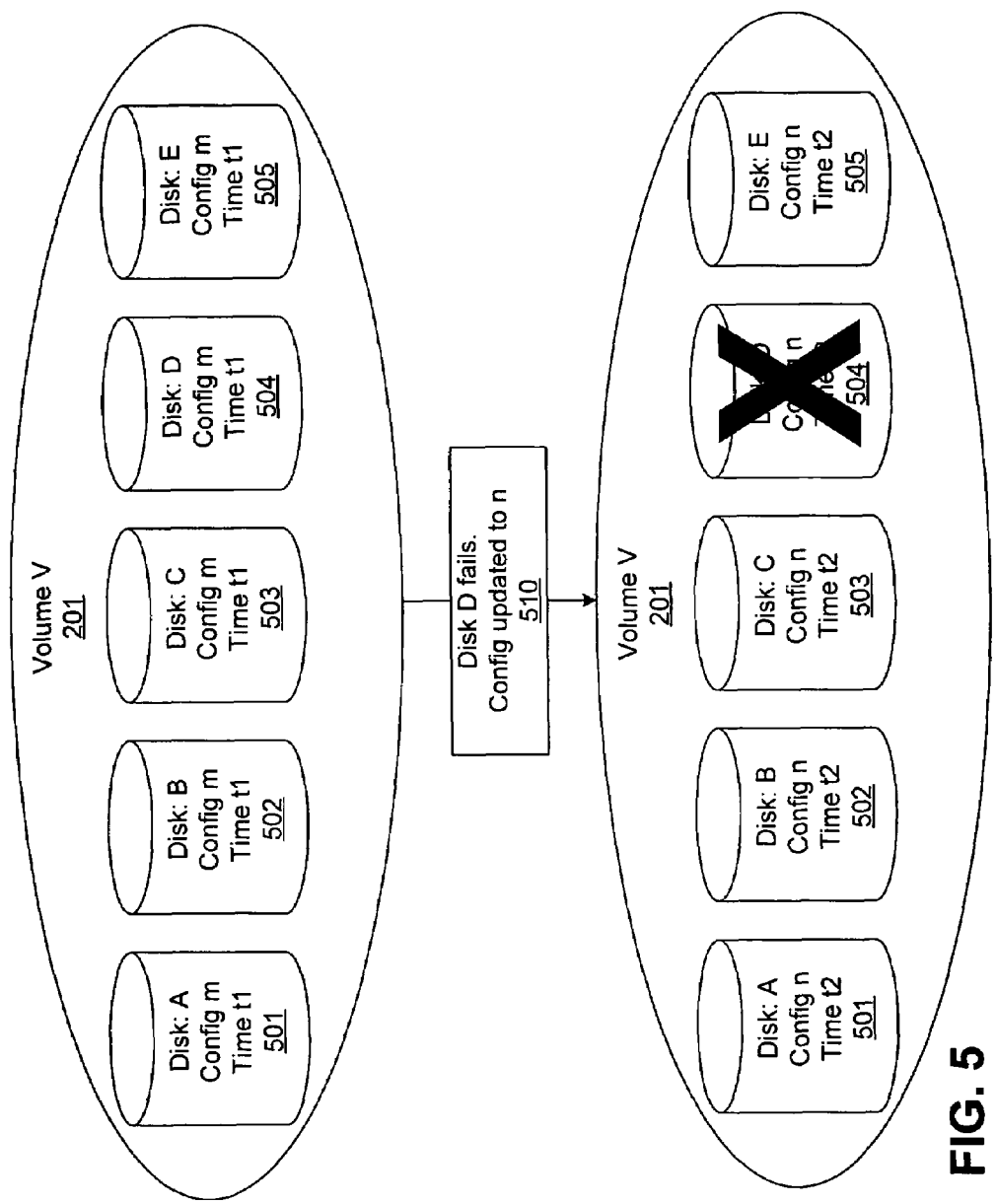
FIG. 5 is a block diagram illustrating an example method of updating a saved configuration in a volume (V), in accordance with an embodiment of the invention.

FIG. 5 is a block diagram illustrating an example method of updating a saved configuration in a volume (V) 201, in accordance with an embodiment of the invention. An embodiment of the invention uses the vol undestroy saved configuration information (e.g., saved configuration information m or n in FIG. 3), which are stored in the RAID area 319 (FIG. 3), in order to recover the state of the volume 201. This saved configuration is updated less frequently than the RAID labels L1 and L2. By reducing the frequency (occurrence) of the saved configuration information updates without losing any essential configuration updates, a method in accordance with an embodiment of the invention improves system performance.

The vol undestroy engine 165 (FIG. 1) uses the vol undestroy saved configuration (e.g., configuration n) to generate accurate RAID labels and to modify the existing RAID labels in order to recover a destroyed volume.

In an embodiment, a user can recover a lost volume by use of a command line, "vol undestroy", and without having to boot into maintenance mode, and the vol undestroy engine 165 will perform the recovery process as described in this disclosure.

The vol undestroy saved configuration information is updated whenever the configuration of the existing volume changes. Because the RAID labels contain more information about the volume configuration than is strictly necessary to recover the volume, the current approach of updating the saved configuration information whenever the RAID labels are updated is an expensive operation (i.e., imposes a performance penalty). In contrast, in an embodiment of the invention, by comparing the current saved configuration information (shown as "m" in the example of FIG. 5) with a pending next configuration information (shown as "n" in FIG. 5), the updates to the vol undestroy saved configuration information are advantageously reduced by only updating the saved configuration information if the pending next configuration information indicates a configuration change in the volume. This method imposes less of a performance penalty on configuration changes. By saving only the information strictly necessary to recover the volume, the amount of data written to the saved configuration information is reduced as compared to the amount of data written to the RAID labels. This reduction in data writes, in turn, reduces the probability of corruption of that data. Furthermore, only the configuration set (i.e., saved configuration) in the RAID label is compared for changes and is updated. Therefore, a minimum set of information in the RAID labels is evaluated and updated, in order to update the saved configuration information necessary to restore a lost volume.

In the example of FIG. 5, assume that the volume 201 has a saved configuration (m). As mentioned above, the saved configuration (m) can be, for example, stored in the RAID area 319, as previously shown in FIG. 3. In the example of FIG. 5, the volume 201 includes disks 501-505, although as mentioned previously, the number of disks in a volume may vary. The saved configuration (m) has information indicating that the disks 501-505 belongs to volume 201 and other volume information (the size of volume 201, the name of the volume 201, RAID tree ID, type, checksum protection type), plex boundaries information (the number of plexes in the volume, plex ID, number of disks), and RAID group boundaries information (the number of RAID groups in the volume, group ID, the number and size of disks in the RAID group, the volume mapping of the disks in the RAID group, RAID parity type). In particular, the saved configuration information is a small set of mostly-static information about a disk's place in its volume.

A transaction (or event) 510 then occurs on the volume 201, which changes the information in the saved configuration information (m), so that the configuration information (m) will be changed to the next configuration information (n) which indicates the changed configuration of the volume 201. In the example of FIG. 5, the transaction 510 is the failing of disk (D) 504, although other types of transactions 510 may occur that changes the saved configuration (m). The next configuration information (n) indicates that the disk (D) 504 is no longer in the volume 201.

Before the transaction 510 is fully committed (completed), both the configuration information (m) ("current saved configuration information") and the configuration information (n) ("next configuration information") are available to the undestroy engine 165 (FIG. 1) for reading. At this time, the undestroy update code in the undestroy engine 165 compares configurations information (m) and (n), and if the two configurations information (m) and (n) differ in configuration information, then saved configuration information (m) is updated by the undestroy engine 165, with the configuration information (n). The undestroy engine 165 also places a timestamp t2 with configuration information (n) to indicate when the configuration information (m) was updated as configuration (n). Note that the volume 201 started with the saved configuration information (m) which was written at time t1. When the disk (D) 504 fails, the saved configuration information (m) is updated to configuration information (n) which is written at time t2. This timestamp t2 is used later by the undestroy engine 165, in order to ignore disks which are out of date with respect to other disks of the volume 201, when the undestroy engine 165 restores the volume 201 which was destroyed. Specifically, assume that configuration information (m), with timestamp t1, includes disk (D) 504 in the volume 201, and configuration information (n), with timestamp t2, does not include disk (D) in the volume 201. Disk (D) 504 will have a saved configuration information (m) with the timestamp t1, which is older than the timestamp t2. Therefore, the undestroy engine 165 will not use disk D's (504) saved configuration information (m) when recovering the volume 201, based upon the older timestamp value of t1 of configuration information (m). Instead, the undestroy engine 165 will use the configuration (n) which has the newer timestamp value of t2, when recovering the volume 201. As a result, the disk (D) 504 is properly not included in the recovered volume 201.

When performing any RAID label update, the previous configuration information (m) is compared to the new, updated configuration information (i.e., the next configuration information n). If any portion of the information stored in the saved configuration of the volume has changed, then the saved configuration information is updated to reflect the next configuration of the volume. Therefore, the saved configuration information is updated to indicate that disk 504 is no longer in the volume 201. This method greatly minimizes the number of writes to be performed to the saved configuration of the volume, as most RAID label updates typically do not involve change to the configuration information stored in both the RAID label and the vol undestroy saved configuration (m), but will nevertheless involve write operations to the RAID label itself. In other words, the RAID labels change quite frequently, due to the many operations in the file system 150. These operations do not change the information stored in the saved configuration. Although the saved configuration could be updated for every time the RAID labels change, this approach would generate many unnecessary write operations to the saved configuration. Frequent write operations are both an unnecessary drain on system performance and may be dangerous, because more frequent write operations increases the chance of corrupting the data stored in the storage system 160. Thus, an embodiment of the invention provides a process to identify which particular label write operations have modified the saved configuration of the volume, and to only update the saved configuration of the volume based on those write operations that have modified the saved configuration of the volume (note that saved configuration m was modified in the example of FIG. 5).

When a volume is destroyed, the RAID labels of its disks are cleared and marked to note that the disks are spare disks in a spare disk pool. The user data of the destroyed volume is still on the disks. However, the data currently on the disks is not changed other than the RAID labels. A disk with data on it but with RAID labels indicating that the disk is in a spare disk pool is an "unzeroed spare." A disk where all of the data on the disk is overwritten by blocks containing the data value '0' is said to be "zeroed"; such a disk with RAID labels that indicate that the disk is in a spare disk pool is called a "zeroed spare."

These disks are now available for use to reconstruct other RAID groups, to create new volumes, or to add to existing volumes. However, as long as a given disk is not zeroed, all the data that was on the disk, while it was part of a volume, is still present, except for the RAID labels. This present data includes the saved configuration. Note that the saved configuration is cleared as soon as the disk begins zeroing (to prevent data corruption in a recovered volume).

When a user realizes that a volume was destroyed by accident or by other reasons as mentioned above, the user can run a "vol undestroy" command, in one embodiment of the invention. This command initiates step 412 in FIG. 4, where a sorting function in the undestroy engine 165 performs a scan through the list of spare disks that are not zeroed and examines the saved configuration on each of those disks. The sorting function also reserves those disks, in order to prevent those spare disks from being allocated away and being used for reconstruction or the creation of other volumes, during the current vol undestroy command's operation. The sorting function identifies all of the unique volumes that are potentially found on all of the unzeroed spare disks, and attempts to determine if the destroyed volume can be recovered (i.e., if enough disks are present to make the destroyed volume usable). As noted above, a set of configuration information saved on the disks is used to determine if that disk can be used (or can not be used) to recover a destroyed volume. The saved configuration information includes a timestamp of the last configuration step, among other configuration information. The sorting function then lists all of these identified unique volumes and prompts the user to select which particular volume to recover. In the example of FIG. 5, based on the use of timestamps t1 and t2 as described above, the sorting function determines that disks A (501), B (502), C (503), and E (505) can be used to restore the volume (V) 201, and that disk D (504) will not be used to restore the volume (V) 201, since the saved configuration of disk D (504) has a timestamp t1 which is older than timestamp t2. At this point in time, a volume builder function in the vol undestroy engine 165 begins its operation.

The volume builder function sorts the disks into a list based on the identifiers (IDs) of which plex and RAID group that each disk belongs to. The volume builder function then performs iterations over the disks, in order to obtain information about each RAID group and plex and fills in the information necessary to reconstitute the RAID labels for that volume. The information used to reconstitute the RAID labels for the volume is obtained from the saved configuration (n) by the volume builder function of the undestroy engine 165.

Figure 6:
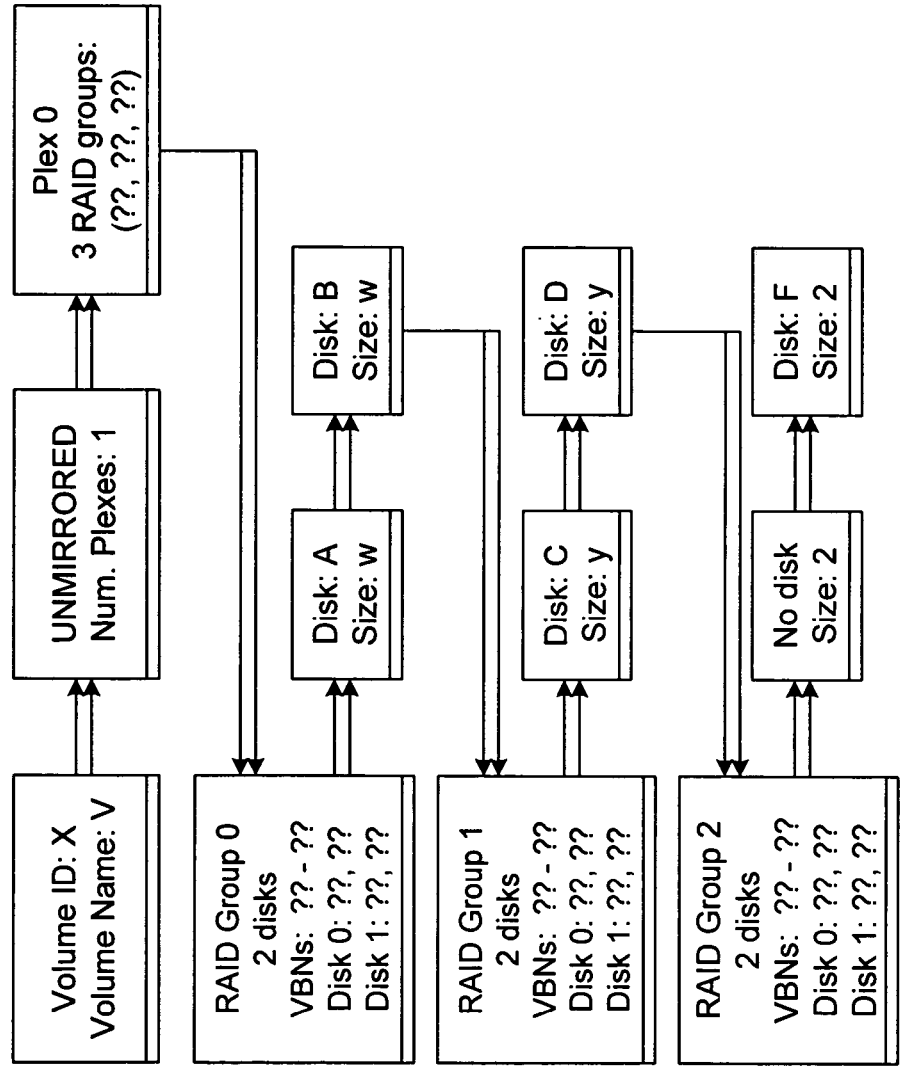
FIG. 6 is a block diagram illustrating an example of a process as performed by the volume builder function in the undestroy engine, in accordance with an embodiment of the invention.

FIG. 6 is a block diagram illustrating an example of the above process as performed by the volume builder function in the undestroy engine 165, in accordance with an embodiment of the invention. Consider a volume (with volume name "V" and volume ID of "X") which has three RAID groups (Group 0, Group 1, and Group 2) in this example. Since the plex is unmirrored, the RAID groups only belong to one plex (Plex 0 in this example). However, this method of the invention can also be used to restore a volume with mirrored plexes.

Each RAID group has two disks. The disks are named A, B, C, D, E, and F, and are arranged as follows in table 1:

TABLE 1

Plex 0, RAID group 0: disk A, disk B
Plex 0, RAID group 1: disk C, disk D
Plex 0, RAID group 2: disk E, disk F The saved configuration information for disk A is shown below in table 2. Note that more information may be present in the saved configuration information, but the below listed data is sufficient for purposes of discussing this step in a method of an embodiment of the invention.

TABLE 2

Save configuration information for disk A

Volume ID: X
Volume name: V
Number of plexes: 1
Plex ID: 0
Number of RAID groups: 3
RAID group ID: 0
Number of disks in RAID group: 2
Sizes of disks in RAID group: w, w
RAID group disk ID: 0
Time stamp: t2

The saved configuration information for disk F is shown in table 3. The disks B, C, D, and E will also contain saved configuration information.

TABLE 3

Save configuration information for disk F

Volume ID: X
Volume name: V
Number of plexes: 1
Plex ID: 0
Number of RAID groups: 3
RAID group ID: 2
Number of disks and RAID group: 2
Sizes of disks in RAID group: z, z
RAID group disk ID: 1
Time stamp: t2

In the example of FIG. 6, assume that volume V is destroyed, and that the disk E has failed (or disk E is unavailable for use when restoring volume V since disk E was, for example, used to reconstruct a different volume). The user then runs the "vol undestroy" command to permit the undestroy engine 165 to function. The undestroy engine 165 obtains the list of disks A, B, C, D, and F, and organizes the list of disks as shown in FIG. 6. The undestroy engine 165 determines that disk E is unavailable for use in the volume V based upon the timestamp in the saved configuration information in disk E. For example, the timestamp in the saved configuration in disk E may be t1, which is older than the timestamp t2 of the saved configuration in the disks A-D and F in this example in FIG. 6. Therefore, the undestroy engine 165 will not use the disk E when restoring the volume V.

Note that at this time, particular fields in the plex 0 and in the RAID group items are unknown and have been denoted by the question marks ("?") in FIG. 6. The undestroy engine 165 then iterates over the whole list of information for disks A-F, and uses the saved configuration information from the disks A-F to fill in the unknown information.

Figure 7:
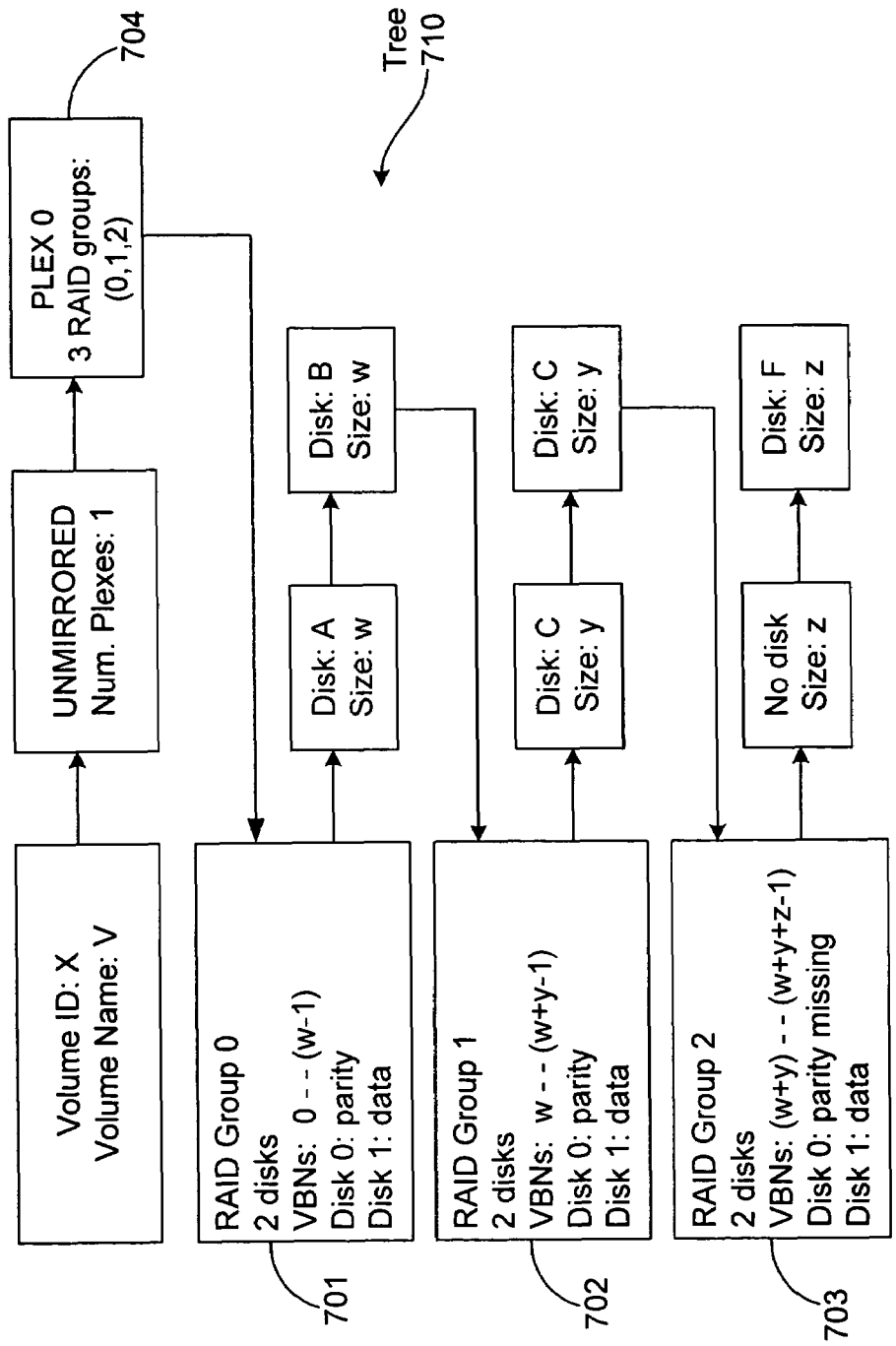
FIG. 7 is a block diagram illustrating the listing of the previously missing configuration information that is determined by the undestroy engine and the constructed tree object, in accordance with an embodiment of the invention.

FIG. 7 is a block diagram illustrating the listing of the previously missing configuration information, after the undestroy engine 165 has performed the above iteration. For example, in block 701, the undestroy engine 165 has identified the disk sizes (VBN mapping) as 0—(w−1) for a disk size w. VBN mapping indicates which particular data blocks are assigned to each particular disk. Disk A has been identified as storing the parity blocks and the disk B has been identified as storing the data blocks. In this particular case, the parity disk is a mirror of the data in the other disk.

Similarly, in block 702, the undestroy engine 165 has identified the VBN mapping as w—(w+y−1). Disk C has been identified as storing the parity blocks and the disk D has been identified as storing the data blocks.

Similarly, in block 703, the undestroy engine 165 has identified the VBN mapping as (w+y)—(w+y+z−1). Disk E has been identified as missing the parity blocks and the disk F has been identified as storing the data blocks.

In block 704, the undestroy engine 165 has identified the RAID groups 0, 1, and 2 as belonging to plex 0.

Note that the undestroy engine 165 may fill in other information in the tree 710, by reading the saved configuration information in the disks A-F.

At this point in time, sufficient data has been determined from the saved configuration information in the disks, in order to regenerate the proper RAID labels for disks A, B, C, D and F. Typically, the label generator 172 (FIG. 1) generates and writes the proper RAID labels. This label generator 172 that is used by vol undestroy engine 165 is different from the label generator 170 which is normally used to generate the RAID labels. The label generator 172 used by vol undestroy engine 165 instead fills in a blank RAID label with the information stored in the saved configuration and then recomputes the remainder of the RAID label through an iterative process as described with reference to FIGS. 6-7. After the RAID labels have been written out, the destroyed volume is restored. The undestroy engine 165 can build the tree object 710 which contains information about the objects of volume, mirror (if any), one or more plexes, RAID groups, and the disks in the raid group.

Note that once the new RAID labels have been written, the restored volume exists on the disks, but not in memory. To instantiate the restored volume in memory, dynamic assimilation of the restored volume is performed, which is an existing functionality in a current DataONTAP product available from Network Appliance, Inc., and is described in the above-mentioned U.S. patent application Ser. No. 10/105,872, by Steven Rodrigues and David Hitz, entitled "RAID ASSIMILATION METHOD AND APPARATUS". At this point in time, the volume has been effectively "undestroyed".

Figure 8:
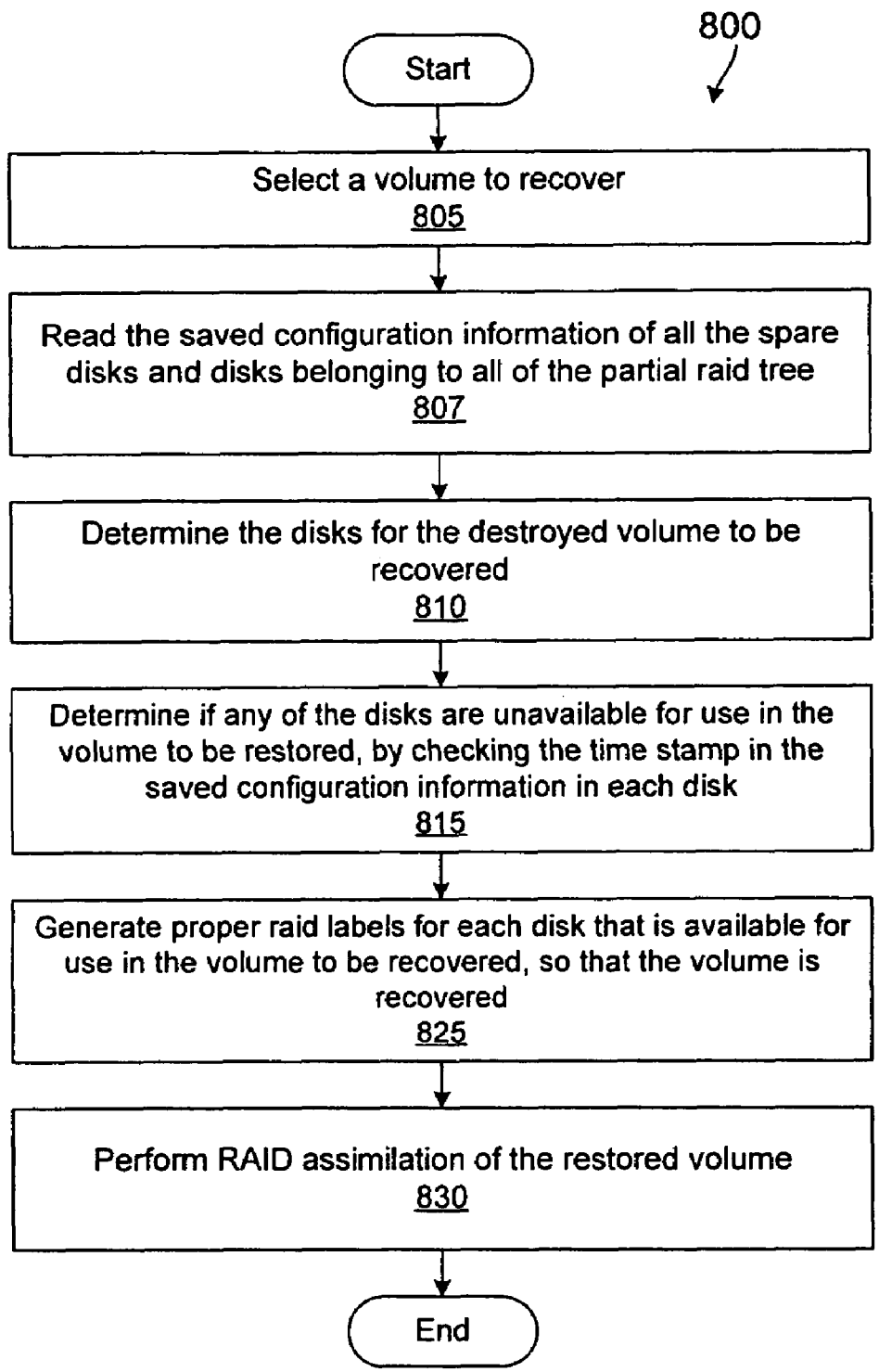
FIG. 8 is a flowchart illustrating additional details of a method for recovering the destroyed data volumes, in accordance with an embodiment of the present invention.

FIG. 8 is a flowchart illustrating additional details of a method 800 for recovering the destroyed data volumes.

In block 805, the user selects the destroyed volume to recover.

In block 807, the undestroy engine 165 reads the saved configuration information of all the spare disks and disks belonging to all of the partial raid tree. A partial raid tree is, for example, the tree 710 (FIG. 7) with missing objects. A partial raid tree occurs when the storage operating system 150 is not able to see or find all of the disks in the raid tree due to, for example, a hardware and/or software problem In block 810, the undestroy engine determines the disks for the destroyed volume that will be recovered.

In block 815, the undestroy engine determines if any of the disks are unavailable for use in the volume to be restored, by checking the timestamp of the saved configuration information in each disk that is identified to belong to the destroyed volume to be recovered.

In block 825, the undestroy engine (specifically the label generator 172 in the undestroy engine) generates the proper raid labels for each disks that is available for use in the volume to be recovered, so that the volume is recovered.

In block 830, RAID assimilation is performed on the restored volume, so that an instance of the restored volume will exist in memory.

In addition to the fully automatic form of the undestroy command, in another embodiment, a manual form of the undestroy command allows the user to input all of the data about a volume. The undestroy engine then recovers the volume. This manual form of the undestroy command typically runs in the maintenance mode.

It is noted the method above can be used to restore a partial volume (which is occurs when the storage operating system 150 is not able to see or find all of the disks in the volume due to, for example, a hardware and/or software problem.

Embodiments of the invention enable the users to recover data volumes which have been destroyed, either through user error or through system failures (or through other events such as, for example, malicious user action), and where the data disks of the destroyed volume are now considered as part of a spare pool. A unique feature of an embodiment of the invention is that the method can recover the most recent saved configuration of the volume, with minimal effort from the user. In particular, major configuration changes to a volume are automatically tracked and are transparent to the user, so that changes such as an addition of a disk to a volume, the reconstruction of a file disk, operations such as changes in the plex (e.g., a volume split or a joining of volumes) result in an automatic update of the saved configuration. This saved configuration is used in the volume recovery process, as described above.

A primary advantage of this invention is in simplicity and cost savings. When a customer has destroyed a volume, volume recovery is now a simple matter of typing a command, rather than hours of talking to a customer support engineer for guidance, searching for records on the volume, and performing the error prone and time-consuming task of label editing, where potential for data loss is extremely high. An embodiment of the invention permits a user to merely type a single command and recover a lost volume.

Figure 9:
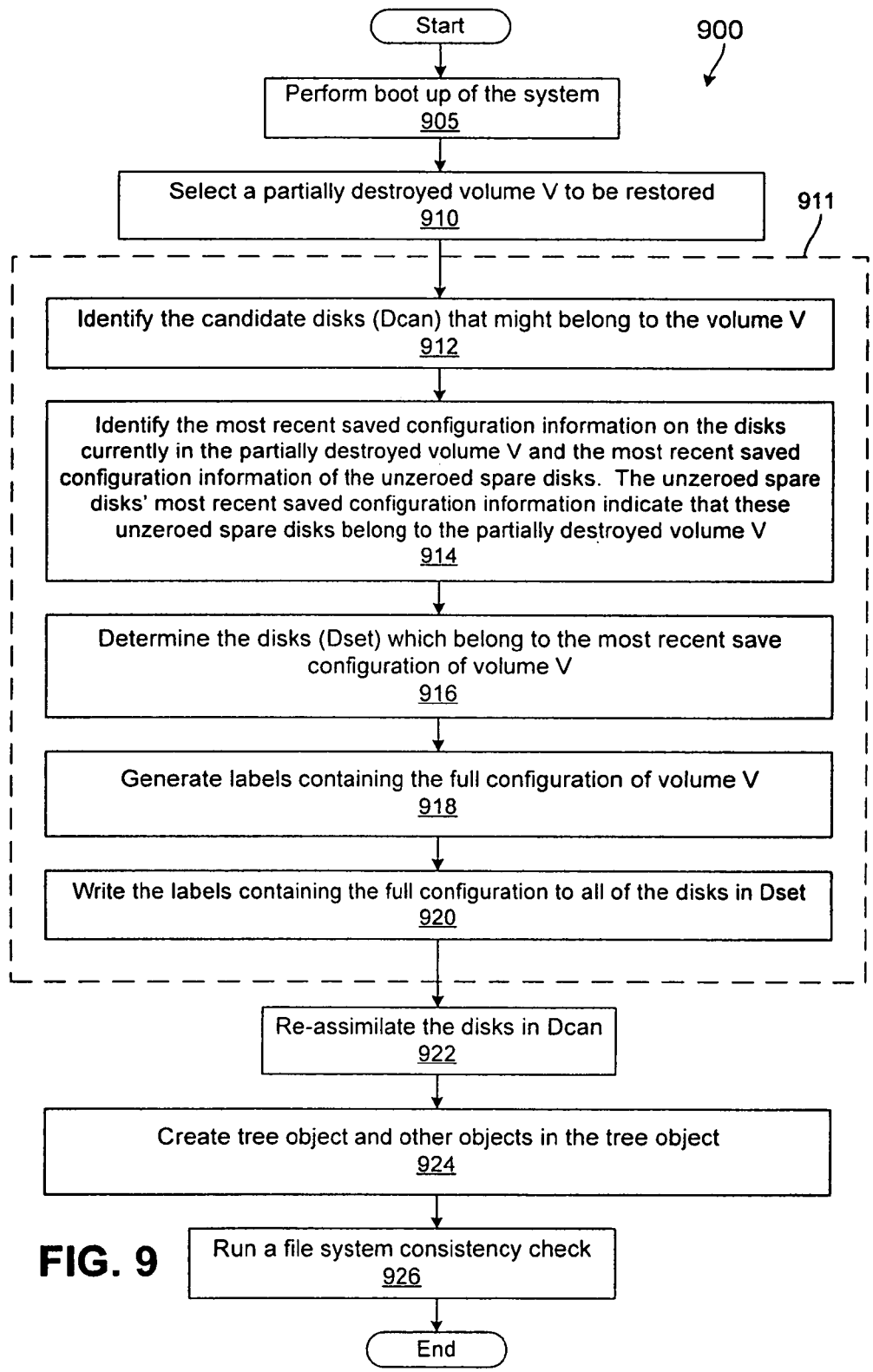
FIG. 9 is a flowchart illustrating a method for recovering a volume that is only partially destroyed, in accordance with an embodiment of the invention.

FIG. 9 is a flowchart illustrating a method 900 for recovering or restoring a volume that is only partially destroyed, in accordance with an embodiment of the invention.

In block 905, a boot up is performed for the system 104 in the file server 103 (FIG. 1).

In block 910, a partially destroyed volume V is selected to be restored. The partially destroyed volume has some disks that have become unzeroed spare disks, and disks that have not been placed in a spare disk pool. As mentioned above, an unzeroed spare disk is a disk that has been placed in a spared disk pool but the data on the unzeroed spare disk is intact except the configuration information now identifies the disk as a spare disk.

In block 911, the vol undestroy engine 165 selects the disks in a most recent saved configuration of volume V. In an embodiment of the invention, block 411 includes blocks 912-920 which are discussed in detail below.

In block 912, the candidate disks (Dcan) that might belong to the volume V are identified by the vol undestroy engine 165. The vol undestroy engine will select all the disks that are now part of the partially destroyed volume and qualifying not zeroed spare disks.

In block 914, the most recent saved configuration information on the disks currently in the partially destroyed volume V (i.e., disks that have not been place in the spare disk pool) is identified by the vol undestroy engine 165. In block 914, the most recent saved configuration information of the unzeroed spare disks are also identified. The unzeroed spare disks' most recent saved configuration will indicate that these unzeroed spare disks belong to the partially destroyed volume V.

The saved configuration information is compared based upon most recent modification time of the saved configuration information, tree id and volume name. If the disk qualifies to be part of destroyed volume, then the disk is placed into undestroy disk pool.

In block 916, the vol undestroy engine 165 determines the disks (Dset, which is a subset of disks of Dcan) which belong to the most recent saved configuration of volume V.

In block 918, the full configuration of volume V is generated. This block 918 involves the vol undestroy engine 165 generating new labels (containing the full configuration of volume V) to be written to the volume V's disks, before the old labels in volume V's disks are modified.

In block 920, the vol undestroy engine 165 writes the labels containing the full configuration to all of the disks in Dset. This block 420 involves modifying the labels in the appropriate disks (Dset) in the partially destroyed volume V that is to be recovered (or generating labels in the usable disks in the volume V).

In block 922, re-assimilation is performed for the disks in Dcan.

In block 924, various objects are created as part of the re-assimilation for the disks in Dcan. These objects include the tree object, volume object, mirror object (if any), and objects for one or more plexes, RAID groups, and the disks in the RAID group.

In block 926, the file system consistency check is run. A standard file system consistency check is performed, in order to permit use of the volume in a storage system.

Various elements in the drawings may be implemented in hardware, software, firmware, or a combination thereof. The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, commands (e.g., "vol undestroy"), variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of updating configuration information associated with a data volume for use in a restore operation after the data volume has been destroyed, the method comprising:

maintaining first configuration information indicating a configuration of the data volume pertaining to a physical storage device set in the data volume, wherein the first configuration information includes a time stamp;

maintaining second configuration information of the data volume, wherein the second configuration information is a subset of the first configuration information and includes portions of the first configuration information for use by the restore operation;

reducing occurrences of updates of the second configuration information of the data volume by updating the second configuration information only when an update occurs to the configuration of the data volume;

updating the time stamp for the second configuration information when the second configuration information is updated;

identifying the second configuration information with a most recent time stamp, wherein the most recent time stamp corresponds to a most recent configuration of the data volume; and using with the second configuration information with the most recent time stamp for restoring the data volume after the data volume has been destroyed.

2. The method of claim 1, further comprising: using the second configuration information to modify existing RAID labels, in order to recover the data volume.

3. The method of claim 1, wherein reducing the occurrences of updates comprises:

comparing a current first configuration information with a pending next first configuration information; and updating the second configuration information, if the pending next first configuration information indicates a configuration change in the data volume, wherein the second configuration information is updated using information in the pending next first configuration information.

4. The method of claim 1, wherein reducing the occurrences of updates comprises:

associating a first time stamp value with a current second configuration information associated with the data volume; and associating a second time stamp with the next first configuration information after the current second configuration information is updated.

5. The method of claim 4, further comprising:

using the time stamp values to determine disks to include in a recovery of the data volume.

6. A method for recovering a an altered data volume, the method comprising:

storing current configuration information indicating a configuration of a data volume;

maintaining saved configuration information of the data volume for use by a recover operation, wherein the saved configuration information is a subset of the current configuration information and includes portions of the current configuration information for use by the recover operation;

determining one or more physical storage devices of the data volume that will be recovered after the data volume has been altered;

identifying saved configuration information with a most recent time stamp, wherein the most recent time stamp corresponds to a most recent configuration of the data volume; and using the saved configuration information with the most recent time stamp for recovering the data volume after the data volume has been altered.

7. The method of claim 6, further comprising:

performing a RAID assimilation on the recovered volume, so that an instance of the restored volume will exist in memory.

8. The method of claim 6, wherein RAID labels are generated for each of the one or more physical storage devices based on reading of the saved configuration information with the most recent time stamp.

9. The method of claim 6, wherein the data volume includes objects for a plex and a RAID group.

10. An apparatus for updating configuration information associated with a data volume for a restore operation after the data volume has been altered, the apparatus comprising:

means for storing first configuration information indicating a configuration of the data volume pertaining to a physical storage device set in the data volume, wherein the first configuration information includes a time stamp;

means for storing second configuration information of the data volume, wherein the second configuration information is a subset of the first configuration information and includes portions of the first configuration information for use by the restore operation;

means for reducing occurrences of updates of the second configuration information of the data volume by updating the second configuration information only when an update occurs to the configuration of the data volume;

means for updating the time stamp for the second configuration information when the second configuration information is updated;

means for identifying the second configuration information with a most recent time stamp, wherein the most recent time stamp corresponds to a most recent configuration of the data volume; and means for using the second configuration information with the most recent time stamp for restoring the data volume after the data volume has been altered.

11. An article of manufacture, comprising:

a machine-readable medium having stored thereon instructions to:

store first configuration information of a data volume into a physical storage device set in the data volume, wherein the first configuration information indicates a configuration of the data volume and includes a time stamp;

store second configuration information of the data volume, wherein the second configuration information is a subset of the first configuration information and includes portions of the first configuration information for use by the restore operation;

reduce occurrences of updates of the second configuration information of the data volume by updating the second configuration information only when an update occurs to the configuration of the data volume;

update the time stamp for the second configuration information when the second configuration is updated;

identify the second configuration information with a most recent time stamp, wherein the most recent time stamp corresponds to a most recent configuration of the data volume; and use the second configuration information with the most recent time stamp for restoring the data volume after the data volume has been destroyed.

12. An apparatus for recovering a volume that is partially destroyed, the apparatus comprising: a storage device manager configured to:

determine the volume that is partially destroyed and that is to be recovered;

store current configuration information indicating a configuration of the volume;
store saved configuration information including a subset of the current configuration information for use by a recovery operation;
update the saved configuration information only when an update occurs to the configuration of the data volume;
update a time stamp for the saved configuration information when the second configuration information is updated;
identify saved configuration information with a most recent time stamp, wherein the most recent time stamp corresponds to a most recent configuration of the volume; and
use with the saved configuration information with the most recent time stamp for recovering the volume.

13. The apparatus of claim 12, wherein the storage device manager is configured to identify candidate disks that belong to the volume, identify a most recent saved configuration information of the volume to be recovered and a most recent saved configuration information of unzeroed spare disks in a spare pool, determine a disks set that belong to the most recently saved configuration of the volume, wherein the disks set is a subset of disks in the candidate disks, generate labels that contain a full configuration of the volume, and write labels containing the full configuration of the volume to the disks set.

14. A method of updating configuration information associated with a data volume for use in a restore operation after the data volume has been destroyed, the method comprising:

storing current configuration information indicating a configuration of the data volume, wherein the current configuration information includes information pertaining to a physical storage device set in the data volume;
maintaining saved configuration information of the data volume for use by the restore operation, wherein the saved configuration information is a subset of the current configuration information and includes portions of the current configuration information for use by the restore operation;
updating the saved configuration information only when an update occurs to the configuration of the data volume; and
executing the restore operation after the data volume has been destroyed using the saved configuration information.

15. The method of claim 14, the method further comprising: comparing the current configuration information at a first time against the current configuration information at a second time, wherein the saved configuration is updated at the second time only when an update occurs to the configuration of the data volume at the second time.

16. The method of claim 14, wherein the execution of the restore operation is performed without reliance upon any human input to enter the saved configuration information.

17. The method of claim 16, wherein the execution of the restore operation is performed without operating the data volume in a maintenance mode.

* * * * *